US012488935B2

(12) United States Patent
Yoshioka et al.

(10) Patent No.: US 12,488,935 B2
(45) Date of Patent: Dec. 2, 2025

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Ryuichiro Tominaga, Nagaokakyo (JP); Hiroki Imaeda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 810 days.

(21) Appl. No.: 17/824,674

(22) Filed: May 25, 2022

(65) Prior Publication Data

US 2022/0392693 A1 Dec. 8, 2022

(30) Foreign Application Priority Data

Jun. 3, 2021 (JP) ................................ 2021-093871

(51) Int. Cl.
*H01F 27/29* (2006.01)
*H01F 27/32* (2006.01)
*H01F 27/34* (2006.01)
*H01F 41/12* (2006.01)

(52) U.S. Cl.
CPC ........... *H01F 27/29* (2013.01); *H01F 27/324* (2013.01); *H01F 27/346* (2013.01); *H01F 41/122* (2013.01)

(58) Field of Classification Search
CPC ...... H01F 27/29; H01F 27/324; H01F 27/346; H01F 41/122
See application file for complete search history.

(56) References Cited

U.S. PATENT DOCUMENTS 12,136,509 B2 * 11/2024 Xu ..................... H01F 17/0033
2008/0231402 A1 * 9/2008 Jow ..................... H01F 17/0013 336/200
2018/0096780 A1 * 4/2018 Sekiguchi ........... H01F 27/2804

FOREIGN PATENT DOCUMENTS

JP H11-251146 A 9/1999
JP 2000124031 A * 4/2000
JP 2005019747 A * 1/2005
JP 2009289900 A * 12/2009

* cited by examiner

*Primary Examiner* — Malcolm Barnes
(74) *Attorney, Agent, or Firm* — Studebaker Brackett PLLC

(57) ABSTRACT

An inductor component comprising a base body; a coil on the base body and wound helically along an axis; and first and second external electrodes disposed on the base body and connected electrically to the coil. The base body includes a substrate having first and second main surfaces that face each other; and an insulating layer on the first main surface. The coil includes first and second coil wires respectively disposed on the first and second main surfaces and covered with the insulating layer; and first and second through wires extending through the substrate from the first main surface to the second main surface and opposite to each other with respect to the axis. The first coil wire, the first through wire, the second coil wire, and the second through wire are connected in the mentioned order, to make up at least a part of the helical.

23 Claims, 11 Drawing Sheets

INDUCTOR COMPONENT

CROSS REFERENCE TO RELATED APPLICATION

This application claims benefit of priority to Japanese Patent Application 2021-093871, filed Jun. 3, 2021, the entire content of which is incorporated herein by reference.

BACKGROUND

Technical Field

The present disclosure relates to an inductor component.

Background Art

A conventional inductor component is described in JP-A-11-251146. The inductor component includes a base body having a length, a width, and a height; a coil disposed in the base body and wound along an axial direction; and a first external electrode and a second external electrode both disposed on the base body and electrically connected to the coil. The base body includes a first end surface and a second end surface at both ends in the length direction; a first side surface and a second side surface at both ends in the width direction; and a bottom surface and a top surface at both ends in the height direction.

The first external electrode is disposed over the entire surface of the first end surface and on a part of each of the first side surface, the second side surface, the bottom surface, and the top surface. The second external electrode is disposed over the entire surface of the second end surface and on a part of each of the first side surface, the second side surface, the bottom surface, and the top surface.

SUMMARY

In the inductor component as in the prior art, the first external electrode and the second external electrode are so-called five-sided electrodes and hence become larger in size, resulting in increased stray capacitance between the coil and the first and second external electrodes.

Accordingly, the present disclosure provides an inductor component capable of reducing stray capacitance between the coil and the external electrodes.

An inductor component as an aspect of the present disclosure comprises a base body; a coil disposed on the base body and wound helically along an axis; and a first external electrode and a second external electrode both disposed on the base body and connected electrically to the coil. The base body includes a substrate having a first main surface and a second main surface that face each other; and an insulating layer disposed on the first main surface. The coil includes a first coil wire disposed on the first main surface and covered with the insulating layer; a second coil wire disposed on the second main surface; and a first through wire and a second through wire both disposed extending through the substrate from the first main surface to the second main surface and arranged opposite to each other with respect to the axis. The first coil wire, the first through wire, the second coil wire, and the second through wire are connected in mentioned order, to make up at least a part of the helical. At least a part of the first external electrode being disposed above the first coil wire and on the insulating layer spaced apart from the first coil wire. When viewed from a direction orthogonal to the first main surface, the first external electrode overlapping each of the first coil wire and the second coil wire, with an overlapping portion between the first external electrode and the first coil wire being smaller in area than an overlapping portion between the first external electrode and the second coil wire.

According to the aspect, in a direction orthogonal to the first main surface, the first external electrode is closer to the first coil wire than to the second coil wire. The area of the overlapping portion between the first external electrode and the first coil wire is smaller than the area of the overlapping portion between the first external electrode and the second coil wire. In this manner, the area of the overlapping portion between the first external electrode and the first coil wire closer to the first external electrode can relatively be reduced, whereby the parasitic capacitance can be decreased between the first external electrode and the first coil wire, resulting in a higher Q value.

Leak current can be suppressed between the first external electrode and the first coil wire, resulting in improved reliability of the inductor component.

Preferably, in an embodiment of the inductor component, the substrate is made of glass.

According to the embodiment, the material of the substrate is glass, which has high insulation properties enabling suppression of eddy current and increase in Q value.

Preferably, in an embodiment of the inductor component, the substrate contains Si element.

According to the embodiment, since the substrate contains Si, the substrate has a high thermal stability. This can suppress the variance of base body dimensions, etc. caused by heat and reduce variations in electric characteristics.

Preferably, in an embodiment of the inductor component, the first through wire and the second through wire extend in a direction orthogonal to the first main surface.

The embodiment can shorten the length of the first through wire and the second through wire, enabling suppression of DC resistance.

Preferably, in an embodiment of the inductor component, the insulating layer has a thickness that is one third or less of the thickness of the substrate, and the insulating layer has a permittivity that is smaller than the permittivity of the substrate.

As used herein, the “thickness” refers to a maximum dimension value in a direction orthogonal to the first main surface.

According to the embodiment, since the thickness of the insulating layer is one third or less of the thickness of the substrate, the inductor component can be reduced in size. Since the dielectric constant of the insulating layer is smaller than the dielectric constant of the substrate despite the shortened distance between the external electrode and the first coil wire due to the thinned insulating layer, the parasitic capacitance can be decreased between the external electrode and the first coil wire, resulting in a higher Q value.

Preferably, in an embodiment of the inductor component, the first coil wire extends in only one direction.

According to the embodiment, since the first coil wire extends in only one direction, a fine first coil wire can be formed by using, e.g., modified lighting in a photolithography process, achieving size reduction of the inductor component.

Preferably, in an embodiment of the inductor component, the second coil wire extends in only one direction.

According to the embodiment, since the second coil wire extends in only one direction, a fine second coil wire can be formed by using, e.g., the modified lighting in the photolithography process, achieving size reduction of the inductor component.

Preferably, in an embodiment of the inductor component, when viewed from a direction orthogonal to the first main surface, a first end of the first coil wire overlaps a first end of the second coil wire, and an angle formed between the first coil wire and the second coil wire is an acute angle.

According to the embodiment, since the coil is densely wound, inductance can be improved.

Preferably, in an embodiment of the inductor component, the angle is 5 degrees or more and 45 degrees or less (i.e., from 5 degrees to 45 degrees).

According to the embodiment, since the coil is more densely wound, inductance can further be improved.

Preferably, in an embodiment of the inductor component, the first coil wire includes a plurality of first coil wires, and the second coil wire includes a plurality of second coil wires. When viewed from a direction orthogonal to the first main surface, a first end of one first coil wire overlaps a first end of one second coil so that the one first coil wire and the one second coil wire make up one set of a plurality of sets; and when viewed from a direction orthogonal to the first main surface, an angle formed between the first coil wire and the second coil wire of at least one set differs from an angle formed between the first coil wire and second coil wire of another set.

According to the embodiment, when viewed from a direction orthogonal to the first main surface, an angle formed between the first coil wire and the second coil wire of at least one set differs from an angle formed between the first coil wire and second coil wire of another set. This enables flexible change of the coil length, so that an inductor component having desired inductance can easily be obtained.

Preferably, in an embodiment of the inductor component, the first coil wire includes a plurality of first coil wires; the first through wire includes a plurality of first through wires, and the second through wire includes a plurality of second through wires; one first coil wire and one first through wire and one second through wire connected respectively to ends of the one first coil wire make up one set of a plurality of sets. When viewed from a direction orthogonal to the first main surface, an extension direction of the first coil wire connected to the first through wire and the second through wire of at least one set is orthogonal to the direction of the axis of the coil, and the first through wire and the second through wire of the at least one set are arranged line-symmetric with respect to the axis of the coil.

According to the embodiment, as compared with the case where the extension direction of the first coil wire tilts with respect to the coil axial direction, the dimension of the coil in the axial direction can be reduced, enabling the inductor component to be reduced in size.

Preferably, in an embodiment of the inductor component, the second coil wire includes a plurality of second coil wires; the first through wire includes a plurality of first through wires, and the second through wire includes a plurality of second through wires; and one second coil wire and one first through wire and one second through wire are connected respectively to ends of the one second coil wire make up one set of a plurality of sets. When viewed from a direction orthogonal to the first main surface, an extension direction of the second coil wire connected to the first through wire and the second through wire of at least one set is orthogonal to the direction of the axis of the coil, and the first through wire and the second through wire of the at least one set are arranged line-symmetric with respect to the axis of the coil.

According to the embodiment, as compared with the case where the extension direction of the second coil wire tilts with respect to the coil axial direction, the dimension of the coil in the axial direction can be reduced, enabling the inductor component to be reduced in size.

Preferably, in an embodiment of the inductor component, at least one of the first through wire and the second through wire has a circular section orthogonal to an extension direction thereof.

The embodiment allows the through holes each receiving the through wire to easily be formed with laser. When filling the through holes with plating, plate can be filled isotropically, enabling plating with less voids to be formed.

Preferably, in an embodiment of the inductor component, at least one of the first through wire and the second through wire includes a plurality of conductor layers, and at least one of the plurality of conductor layers contains copper as a main component.

According to the embodiment, at least one conductor layer of the through wire contains copper as a main component. Due to copper having high conductivity, the through wire can have suppressed DC resistance.

Preferably, in an embodiment of the inductor component, at least one of the first through wire and the second through wire includes a plurality of conductor layers, and at least one of the plurality of conductor layers is made of conductive resin.

The embodiment enables the through holes to easily be filled with conductive resin.

Preferably, in an embodiment of the inductor component, when viewed from a direction orthogonal to the first main surface, the first coil wire has a recess formed on an upper surface of a portion that overlaps an end surface, toward the first coil wire, of the through wire connected to the first coil wire.

According to the embodiment, since the upper surface of the first coil wire is concaved, the area of the upper surface of the first coil wire increases, leading to improvement in intimate adhesiveness with the insulating layer.

Preferably, in an embodiment of the inductor component, the base body is of a rectangular parallelepiped shape having a length, a width, and a height; the inductor component has a volume of 0.08 $mm^3$ or less; and the inductor component has a long side whose length is 0.65 mm or less.

As used herein, the "long side length" refers to a maximum value among the length, width, and height of the inductor component.

According to the embodiment, due to the smaller volume and shorter long side, the component weight can be lightened. For this reason, in spite of the smaller external electrode, required mounting strength can be obtained.

Preferably, in an embodiment of the inductor component, the first coil wire, the second coil wire, the first through wire, and the second through wire contain copper as a main component.

According to the embodiment, by using inexpensive and highly conductive copper as the material of the coil wires and through wires, mass productivity of the inductor component can be improved with increased Q value.

According to the inductor component that is one aspect of the present disclosure, the stray capacitance can be decreased between the coil and the external electrodes.

DETAILED DESCRIPTION

An inductor component as one aspect of the present disclosure will now be described in detail based on embodiments shown in drawings. The drawings partly include schematic ones and may not reflect actual dimensions or ratios.

First Embodiment

Figure 1:
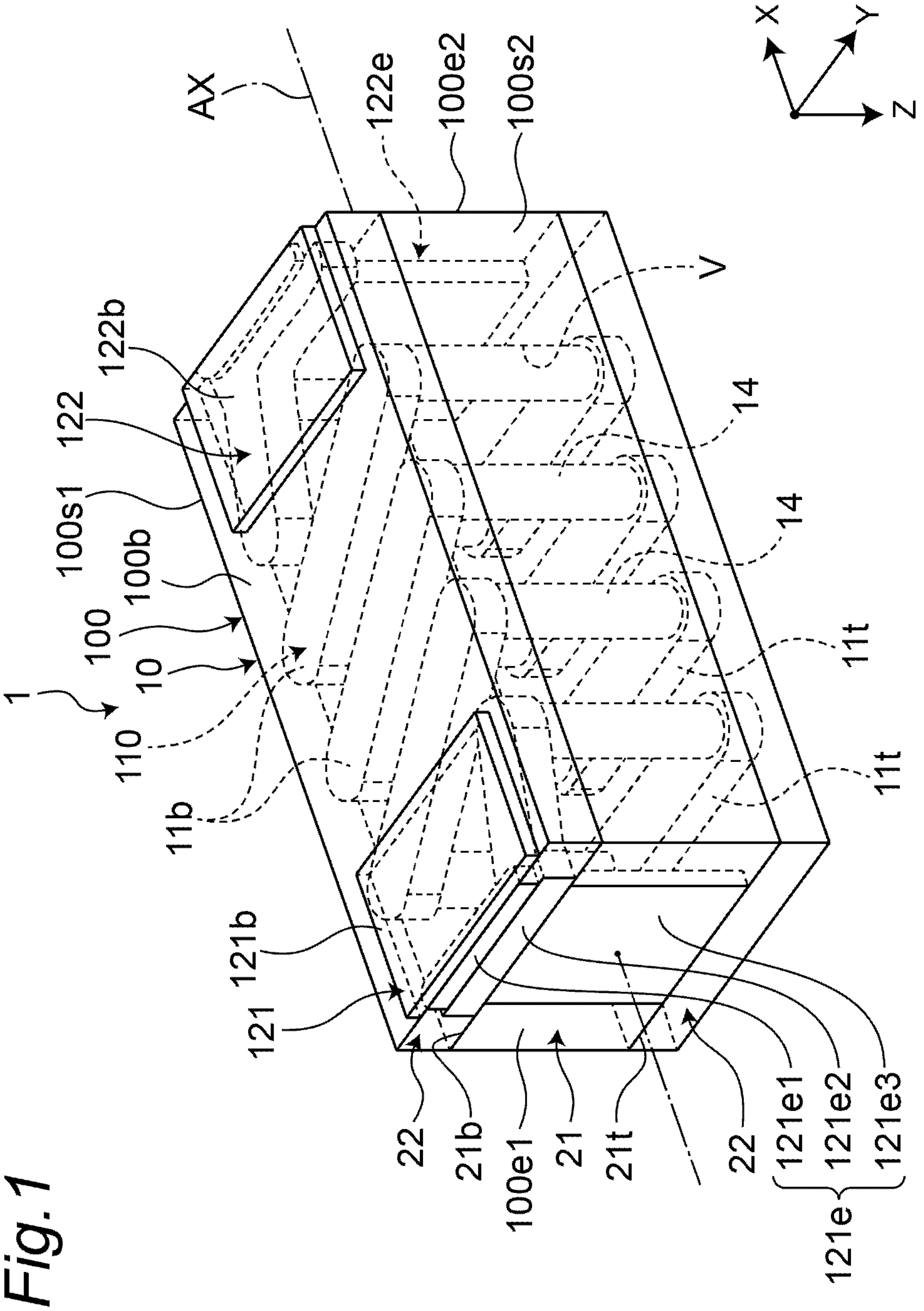
FIG. 1 is a schematic perspective view of an inductor component seen from a bottom surface side.
Figure 2:
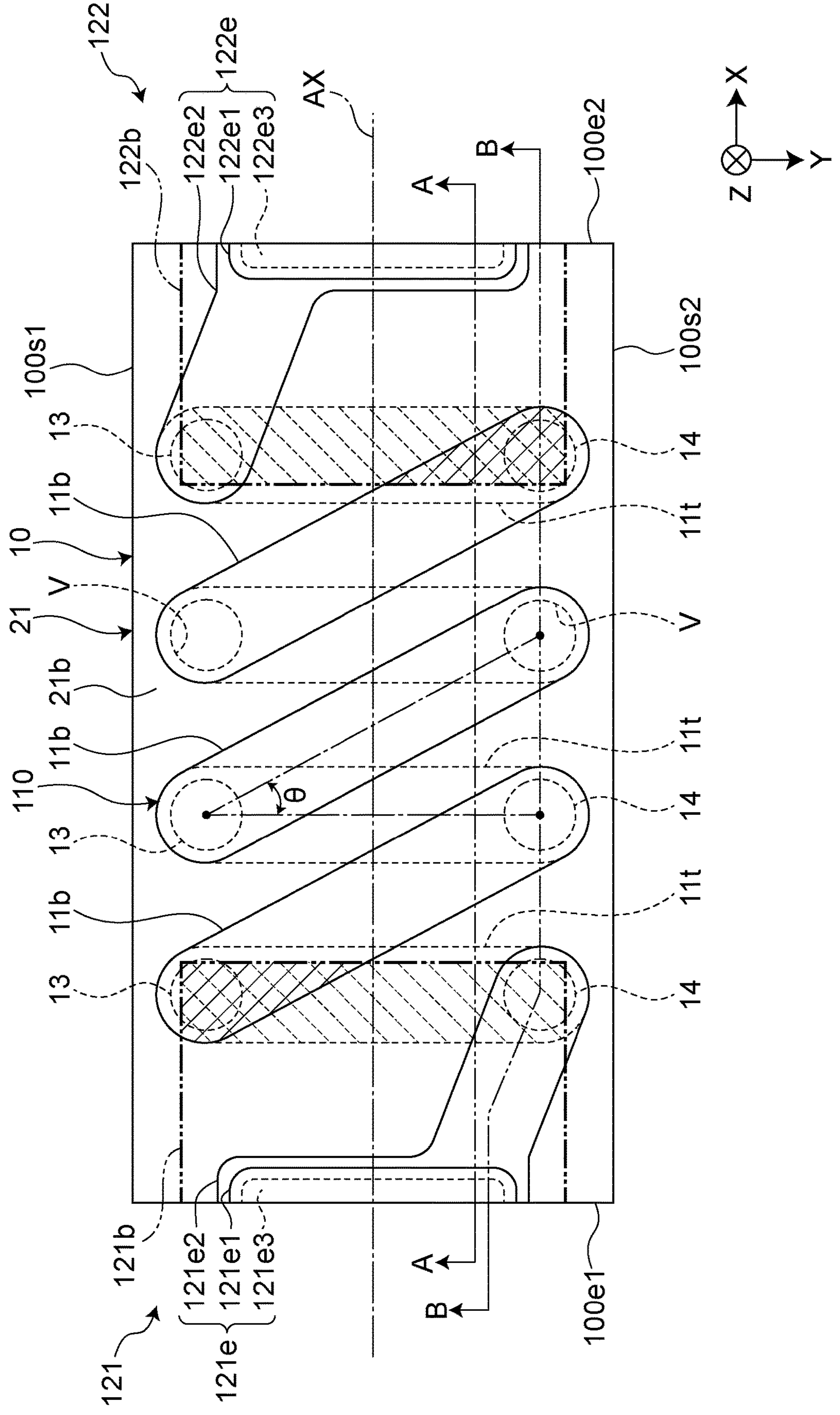
FIG. 2 is a schematic bottom view of the inductor component seen from the bottom surface side.
Figure 3:
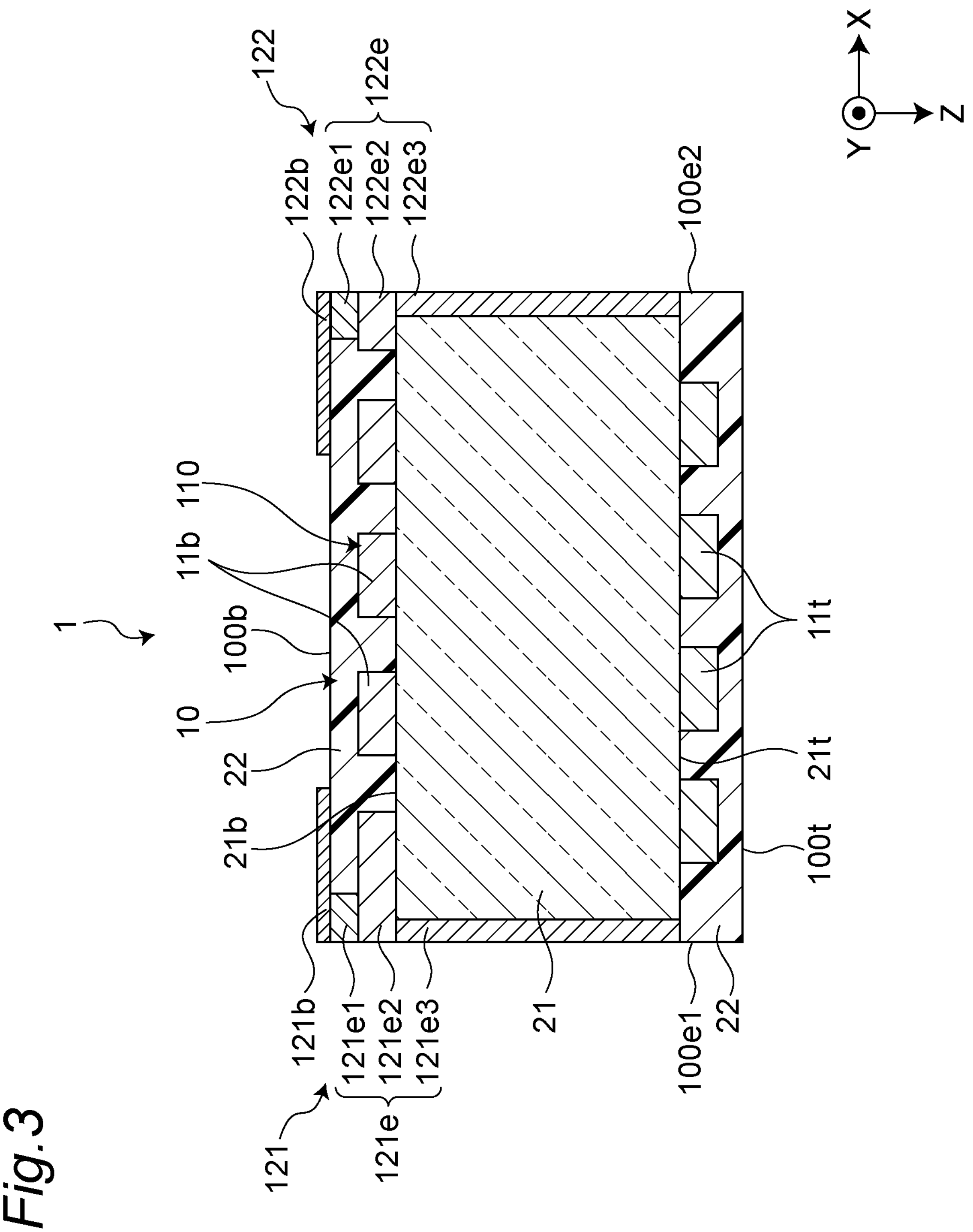
FIG. 3 is a section view taken along line A-A of FIG. 2.

An inductor component 1 according to a first embodiment will be described below. FIG. 1 is a schematic perspective view of the inductor component 1 seen from a bottom surface side. FIG. 2 is a schematic bottom view of the inductor component 1 seen from the bottom surface side. FIG. 3 is a section view taken along line A-A of FIG. 2. In FIG. 2, for convenience, an insulation layer of a base body is not shown and a part (bottom surface portion) of each of external electrodes is indicated by a two-dot chain line.

1. Overview Configuration

An overview configuration of the inductor component 1 will be described. The inductor component 1 is e.g. a surface-mounted inductor component that is used in a high-frequency signal transmission circuit. As shown in FIGS. 1, 2, and 3, the inductor component 1 comprises a base body 10, a coil 110 disposed on the base body 10 and wound helically along an axis AX direction, and a first external electrode 121 and a second external electrode 122 that are disposed on the base body 10 and electrically connected to the coil 110. The axis AX of the coil 110 is a straight line passing through a center of an inner-diameter part of the coil 110. The axis AX of the coil 110 has no dimensions in directions orthogonal to the axis AX.

The base body 10 has a length, a width, and a height. The base body 10 includes a first end surface **100*e*1 and a second end surface 100*e*2 at both ends in the length direction, a first side surface 100*s*1 and a second side surface 100*s*2 at both ends in the width direction, and a bottom surface 100*b* and a top surface 100*t* at both ends in the height direction. That is, an outer surface 100 of the base body 10 includes the first end surface 100*e*1 and the second end surface 100*e*2, the first side surface 100*s*1 and the second side surface 100*s*2, and the bottom surface 100*b* and the top surface 100*t***.

In the following, as shown in the drawings, for convenience of description, X direction is the length direction (longitudinal direction) of the base body 10 extending from the first end surface **100*e*1 toward the second end surface 100*e*2. Y direction is the width direction of the base body 10 extending from the first side surface 100*s*1 toward the second side surface 100*s*2. Z direction is the height direction of the base body 10 extending from the bottom surface 100*b* toward the top surface 100*t***. X direction, Y direction, and Z direction are directions orthogonal to one another and make up a right-handed system when arranged in the order of X, Y, and Z.

The "outer surface 100 of the base body" including the first end surface **100*e*1, second end surface 100*e*2, first side surface 100*s*1, second side surface 100*s*2, bottom surface 100*b*, and top surface 100*t* of the base body 10 does not mean a mere surface facing the outer peripheral side of the base body 10 but means a surface serving as a boundary between the outside and the inside of the base body 10. "Above the outer surface 100 of the base body 10" refers to a direction toward the outside, out of the outside and the inside of the outer surface 100 as the boundary, with respect to the outer surface 100, instead of referring to one absolute direction like vertically above defined by the direction of gravity. Accordingly, "above the outer surface 100**" is a relative direction defined by the orientation of the outer surface. "Above" an element includes not only above the element with a space in between, i.e., an upper position via another object on the element or a spaced-apart upper position, but also a position directly on the element in contact therewith.

The base body 10 includes a substrate 21 and an insulation layer 22 disposed on the substrate 21. The substrate 21 has a bottom surface **21*b* and a top surface 21*t* that face each other in Z direction. The insulating layer 22 is disposed on the bottom surface 21*b* of the substrate 21. The bottom surface 21*b* corresponds to an example of "first main surface" defined in claims, while the top surface 21*t*** corresponds to an example of "second main surface" defined in claims.

The coil 110 includes: a bottom surface wire **11*b* disposed on the bottom surface 21*b* and covered with the insulation layer 22; a top surface wire 11*t* disposed on the top surface 21*t*; and a first through wire and a second through wire that are disposed extending through the substrate 21 from the bottom surface 21*b* to the top surface 21*t* and arranged opposite to each other with respect to the axis AX. The bottom surface wire 11*b* corresponds to an example of "first coil wire" defined in claims, while the top surface wire 11*t* corresponds to an example of "second coil wire" defined in claims. The bottom surface wire 11*b*, the first through wire 13, the top surface wire 11*t*, and the second through wire 14** are connected in this order to thereby constitute at least a part of the helical.

At least a part of the first external electrode 121 is disposed on the insulating layer 22 above the bottom surface wire **11*b* and spaced part from the bottom surface wire 11*b*. As shown in FIG. 2, when viewed from a direction orthogonal to the bottom surface 21*b*, the first external electrode 121 overlaps each of the bottom surface wire 11*b* and the top surface wire 11***t*, with the area of an overlapping portion between the first external electrode 121 and the bottom surface wire 11*b* being smaller than the area of an overlapping portion between the first external electrode 121 and the top surface wire 11*t*. In FIG. 2, the overlapping portion between the first external electrode 121 and the bottom surface wire 11*b* is hatched by solid lines, while the overlapping portion between the first external electrode 121 and the top surface wire 11*t* is hatched by broken lines.

According to the above configuration, in a direction orthogonal to the bottom surface 21*b*, the first external electrode 121 is closer to the bottom surface wire 11*b* than to the top surface wire 11*t*. The area of the overlapping portion between the first external electrode 121 and the bottom surface wire 11*b* is smaller than the area of the overlapping portion between the first external electrode 121 and the top surface wire 11*t*. Since the overlapping portion between the first external electrode 121 and the bottom surface wire 11*b* closer to the first external electrode 121 can have a relatively small area in this manner, the parasitic capacitance can be decreased between the first external electrode 121 and the bottom surface wire 11*b*, achieving a high Q value. Leak current can be suppressed between the first external electrode 121 and the bottom surface wire 11*b*, enabling the inductor component 1 to have improved reliability.

The second external electrode 122 has the same configuration as that of the first external electrode 121 and has the same operation effect as that of the first external electrode 121.

At least a part of the second external electrode 122 is disposed on the insulating layer 22 above the bottom surface wire 11*b* and spaced part from the bottom surface wire 11*b*. When viewed from a direction orthogonal to the bottom surface 21*b*, the second external electrode 122 overlaps each of the bottom surface wire 11*b* and the top surface wire 11*t*, with the area of an overlapping portion (hatched by solid lines of FIG. 2) between the second external electrode 122 and the bottom surface wire 11*b* being smaller than the area of an overlapping portion (hatched by broken lines of FIG. 2) between the second external electrode 122 and the top surface wire 11*t*. The parasitic capacitance can thus be decreased between the second external electrode 122 and the bottom surface wire 11*b*, achieving a high Q value. Leak current can be suppressed between the second external electrode 122 and the bottom surface wire 11*b*, enabling the inductor component 1 to have improved reliability.

In at least the first external electrode out of the first external electrode 121 and the second external electrode 122, the area overlapping with the bottom surface wire 11*b* may be smaller than the area overlapping with the top surface wire 11*t*.

2. Parts Configurations

<Inductor Component 1>

The inductor component 1 has a volume of 0.08 $mm^3$ or less and a long side dimension of 0.65 mm or less. The long side dimension of the inductor component 1 refers to a maximum value of the length, width and height of the inductor component 1, and in this embodiment, refers to the length in X direction. According to the above configuration, because the inductor component 1 has a reduced volume and a shortened long side dimension, the weight of the inductor component 1 is lightened. For this reason, a required mounting strength can be obtained despite the reduced size of the external electrodes 121 and 122.

Specifically, the size (length (X direction)×width×(Y direction)×height (Z direction) of the inductor component 1 is e.g. 0.6 mm×0.3 mm×0.3 mm, 0.4 mm×0.2 mm×0.2 mm, 0.25 mm×0.125 mm×0.120 mm, etc. The width and the height may not be equal, and the size may be e.g. 0.4 mm×0.2 mm×0.3 mm, etc.

<Base Body 10>

The base body 10 comprises the substrate 21 having the bottom surface 21*b* and the top surface 21*t* at both ends in Z direction, and the insulation layer 22 covering both of the bottom surface 21*b* and the top surface 21*t* of the substrate 21. The insulation layer may be disposed only on the bottom surface 21*b* out of the bottom surface 21*b* and the top surface 21*t*.

The material of the substrate 21 is preferably glass, which has high insulation properties enabling suppression of eddy current and increase in Q value. The substrate 21 preferably contains Si element, whereby the substrate has a high thermal stability, which can suppress the variance of base body 10 dimensions, etc. caused by heat and reduce variations in electric characteristics.

The base body 10 preferably is preferably a single-layer glass plate. This can ensure the strength of the base body 10. In the case of the single-layer glass plate, Q value at high frequency can be increased due to small dielectric loss. Because there is no sintering process as in the case of a sintered body, deformation of the base body 10 during sintering can be suppressed, thereby achieving suppression of the pattern deviation and provision of an inductor component with small inductance tolerance.

From the viewpoint of fabrication method, the material of the single-layer glass plate is preferably a glass plate having photosensitivity represented by FoturanII (registered trademark of SchottAG company). In particular, the single-layer glass plate preferably contains cerium oxide (ceria: $CeO_2$) In this case, cerium oxide acts as a sensitizer to make processing by photolithography easier.

The single-layer glass plate may be a glass plate having no photosensitivity because it can be processed by machining such as drilling or sandblasting, dry/wet etching using e.g. a photoresist metal mask, laser processing, etc. The single-layer glass plate may be made of sintered glass paste or formed by a known method such as float glass process.

The single-layer glass plate is a plate-shaped member of a single layer not taking in wiring (a part of the coil 110) such as internal conductors integrated inside a glass body. In particular, the single-layer glass plate has an outer surface as a boundary between the outside and the inside of the glass body. Through holes V formed in the single-layer glass plate are also included in the outer surface 100 of the base body 10 because they are boundaries between the outside and the inside of the glass body.

The single-layer glass plate is basically in an amorphous state, but may include a crystalized portion. For example, in the case of the FoturanII, whereas glass in the amorphous state has a dielectric constant of 6.4, the dielectric constant can be reduced to 5.8 by crystalizing. This can reduce the stray capacitance between conductors (in wiring) in the vicinity of the crystallized portion.

The insulation layer 22 is a member that covers wires (the bottom surface wire 11*b* and the top surface wire 11*t*) to serve to protect the wires from external forces to prevent damages on the wires or serve to improve the insulation properties of the wires. The insulation layer 22 is preferably e.g. an inorganic film with excellent insulation and thinning properties, made of an oxide, nitride or oxynitride of silicon or hafnium. The insulation layer 22 may be epoxy, polyimide, or other resin film that is easier to form. In particular, the insulation layer 22 is preferably made of a material with a low dielectric constant, whereby in the case of presence of the insulation layer 22 between the coil 110 and the external electrodes 121 and 122, it is possible to reduce the stray capacitance formed between the coil 110 and the external electrodes 121 and 122.

The insulation layer 22 can be formed e.g. by stacking resin films such as ABF GX-92 (manufactured by Ajinomoto Fine-Techno Co. Inc.) or by applying and heat curing paste-like resin.

Preferably, the thickness of the insulating layer 22 has a thickness that is one third or less of the thickness of the substrate 21, and the insulating layer 22 has a permittivity that is smaller than the permittivity of the substrate 21. The "thickness" refers to a maximum dimension value in a direction orthogonal to the bottom surface 21*b*. This reduces the thickness of the insulating layer 22 to achieve size reduction of the inductor component 1. Since the dielectric constant of the insulating layer 22 is smaller than the dielectric constant of the substrate 21 despite the shortened distance between the first and second external electrodes 121 and 122 and the bottom surface wire 11*b* due to the thinned insulating layer 22, the parasitic capacitance can be decreased between the first and second external electrodes 121 and 122 and the bottom surface wire 11*b*, resulting in a higher Q value.

The base body 10 may include a sintered body. That is, the substrate 21 may be a sintered body so that the strength of the base body 10 can be ensured. Also, by using ferrite, etc. for the sintered body, the inductance acquisition efficiency can be enhanced.

The base body 10 may further comprise an insulation film that covers a part of the top of insulating layer 22 toward the bottom surface 21*b*. The insulation film lies at least between the first external electrode 121 and the second external electrode 122 that are disposed on the insulating layer 22, to securely prevent short circuit between the first external electrode 121 and the second external electrode 122. The material of the insulation film may be the same as that of the insulating layer 22.

<Coil 110>

The coil 110 comprises: the bottom surface wire 11*b* arranged above the bottom surface 21*b* of the substrate 21 and covered with the insulation layer 22; the top surface wire 11*t* arranged above the top surface 21*t* of the substrate 21 and covered with the insulation layer 22; and the pair of through wires 13 and 14 extending through the substrate 21 from the bottom surface 21*b* to the top surface 21*t* and arranged opposite to each other with respect to the axis AX. The bottom surface wire 11*b*, the first through wire 13, the top surface wire 11*t*, and the second through wire 14 are connected in order and constitute at least a part of the coil 110 wound in the axis AX direction.

According to the above configuration, because the coil 110 is the coil 110 with a so-called helical shape, it is possible to reduce the region where the bottom surface wire 11*b*, the top surface wire 11*t*, and the through wires 13 and 14 run in parallel along the winding direction of the coil 110 in a section orthogonal to the axis AX and to thereby decrease the stray capacitance of the coil 110.

As used herein, the helical shape refers to a shape in which the number of turns of the entire coil is greater than one turn, with the number of turns of the coil in a section orthogonal to the axis being less than one turn. One turn or more refers to a state where in a section orthogonal to the axis the coil wiring has a portion running in parallel in the winding direction radially adjacent when viewed from the axial direction. Less than one turn refers to a state where in a section orthogonal to the axis the coil wiring does not have the portion running in parallel in the winding direction radially adjacent when viewed from the axial direction. The portion of the wiring running in parallel encompasses not only an extended portion extending in the winding direction of the wiring but also a pad portion connected to the end of the extended portion and having a larger width than the width of the extended portion.

The bottom surface wire 11*b* extends in only one direction. Specifically, the bottom surface wire 11*b* extends in Y direction with a slight tilt toward X direction. A plurality of the bottom surface wires 11*b* are arranged in parallel along X direction. When using e.g. modified lighting such as ring-shaped lighting or dipole lighting in the photolithography process, the pattern resolution in a specific direction is increased so that a more fine pattern can be formed. According to the above configuration, due to extension of the bottom surface wire 11*b* in only one direction, use of e.g. the modified lighting in photolithography process enables formation of a fine bottom surface wire 11*b*, allowing the inductor component 1 to be reduced in size.

The top surface wire 11*t* extends in only one direction. Specifically, the top surface wire 11*t* is of a shape extending in Y direction. A plurality of the top surface wires 11*t* are arranged in parallel along X direction. According to the above configuration, due to extension of the top surface wire 11*t* in only one direction, use of e.g. the modified lighting in photolithography process enables formation of a fine top surface wire 11*t*, allowing the inductor component 1 to be reduced in size.

The first through wire 13 is arranged in the through hole V of the base body 10 toward the first side surface 100*s*1 with respect to the axis AX, while the second through wire 14 is arranged in the through hole V of the base body 10 toward the second side surface 100*s*2 with respect to the axis AX. The first through wire 13 and the second through wire 14 each extend in a direction orthogonal to the bottom surface 21*b* and the top surface 21*t* (bottom surface 100*b* and top surface 100*t*). This can shorten the length of the first through wire 13 and the second through wire 14, enabling suppression of DC resistance (Rdc). A plurality of the first through wires 13 are arranged in parallel along X detection and a plurality of the second through wires 14 are arranged in parallel along X detection.

The bottom surface wire 11*b* and the top surface wire 11*t* are made of a good conductive material such as copper, silver, gold, or an alloy thereof. The bottom surface wire 11*b* and the top surface wire 11*t* may be a metal film formed by plating, vapor deposition, sputtering, etc. or may be a sintered metal body made of conductor paste applied and sintered. The bottom surface wire 11*b* and the top surface wire 11*t* each may be of a multi-layer structure in which a plurality of metal layers are stacked. The bottom surface wire 11*b* and the top surface wire 11*t* preferably have a thickness of 5 μm or more and 50 μm or less (i.e., from 5 μm to 50 μm).

The bottom surface wire 11*b* and the top surface wire 11*t* are preferably formed by the semi-additive method, thereby rendering it possible to form the bottom surface wire 11*b* and top surface wire 11*t* with low electrical resistance, high accuracy, and high aspect ratio. For example, the bottom surface wire 11*b* and the top surface wire 11*t* can be formed as follows. First, over the entire outer surface 100 of the individualized base body 10, a titanium layer and a copper layer are formed in the mentioned order by sputtering or electroless plating to form a seed layer, and a patterned photoresist is formed on the seed layer. Next, a copper layer is formed on the seed layer in an opening of the photoresist by electroplating. Subsequently, the photoresist and the seed layer are removed by wet etching or dry etching. As a result, the bottom surface wire 11*b* and top surface wire 11*t* patterned into any shape can be formed on the outer surface 100 of the base body 10.

The first through wire 13 and the second through wire 14 can be formed in the through holes V previously formed in the base body 10, by using the materials and methods exemplified for the bottom surface wire 11*b* and the top surface wire 11*t*.

Preferably, the bottom surface wire 11*b*, the top surface wire 11*t*, the first through wire 13, and the second through wire 14 contain copper as a main component. According to this, due to use of inexpensive and highly conductive copper as the material of the wires, mass productivity of the inductor component 1 can be improved with increased Q value.

Preferably, as shown in FIG. 2, when viewed from a direction orthogonal to the bottom surface 21*b*, a first end of the bottom surface wire 11*b* overlaps a first end of the top surface wire 11*t*, and an angle θ formed between the bottom surface wire 11*b* and the top surface wire 11*t* is an acute angle. The angle θ is an angle formed between a center line (one-dot chain line of FIG. 2) of the width of the bottom surface wire 11*b* and a center line (one-dot chain line of FIG. 2) of the width of the top surface wire 11*t* when viewed from a direction orthogonal to the bottom surface 21*b*.

According to the above configuration, since the coil 110 is densely wound, inductance can be improved. The angle θ may be an acute angle in at least one set of the bottom surface wire 11*b* and the top surface wire 11*t* out of all sets of the bottom surface wire 11*b* and the top surface wire 11*t*.

Preferably, the angle θ is 5 degrees or more and 45 degrees or less (i.e., from 5 degrees to 45 degrees) in at least one set of the bottom surface wire 11*b* and the top surface wire 11*t*. According to this, since the coil 110 is more densely wound, inductance can further be improved.

Preferably, as shown in FIG. 2, the top surface wire 11*t* includes a plurality of top surface wires 11*t*, and the first through wire 13 and the second through wire 14 include respectively a plurality of first through wires 13 and a plurality of second through wires 14. One top surface wire 11*t* and one first through wire 13 and one second through wire 14 connected respectively to ends of the one top surface wire 11*t* make up one set of a plurality of sets. When viewed from a direction orthogonal to the bottom surface 21*b*, an extension direction of the top surface wire 11*t* connected to the first through wire 13 and the second through wire 14 of at least one set is orthogonal to the direction of the axis AX of the coil 110, and the first through wire 13 and the second through wire 14 of the at least one set are arranged line-symmetric with respect to the axis AX of the coil 110.

According to the above configuration, as compared with the case where the extension direction of the top surface wire 11*t* tilts with respect to the axis AX of the coil 110, the dimension in the direction of the axis AX of the coil 110 can be reduced, enabling the inductor component 1 to be reduced in size. Preferably, the first through wire 13 and the second through wire 14 of one half or more of all the sets are arranged line-symmetric with respect to the axis AX of the coil 110, and more preferably, the first through wire 13 and the second through wire 14 of all the sets are arranged line-symmetric with respect to the axis AX of the coil 110, thereby achieving a further reduction in the dimension in the direction of the axis AX of the coil 110.

Preferably, at least one of the first through wire 13 and the second through wire 14 has a circular section orthogonal to an extension direction thereof. The above configuration allows the through holes V each receiving the through wire to easily be formed with laser. When filling the through holes with plating, plate can be filled isotropically, enabling plating with less voids to be formed. If all of the first through wires 13 and the second through wires 14 have a circular section, the through holes V can more easily be formed.

Preferably, the axis AX of the coil 110 is parallel to the bottom surface 100*b* of the base body 10. Specifically, the axis AX is parallel to X direction. According to this, when mounting the inductor component 1 with the bottom surface 100*b* of the base body 10 facing the mount substrate, interference of the mount substrate with magnetic flux of the coil 110 can be reduced, resulting in improved inductance acquisition efficiency.

<First External Electrode 121 and Second External Electrode 122>

The first external electrode 121 is disposed toward the first end surface 100*e*1 with respect to the center in X direction of the base body 10 in such a manner as to be exposed from the outer surface 100 of the base body 10. The second external electrode 122 is disposed toward the second end surface 100*e*2 with respect to the center in X direction of the base body 10 in such a manner as to be exposed from the outer surface 100 of the base body 10.

The first external electrode 121 is connected to a first end of the coil 110, while the second external electrode 122 is connected to a second end of the coil 110. The first external electrode 121 and the second external electrode 122 may each be made of a single-layer conductive material or a plural-layer conductive material. In the case of the single-layer conductive material, it is made of e.g. the same material as that of the coil 110, whereas in the case of the plural-layer conductive material, it is composed of e.g. a base layer of the same material as that of the coil 110 and a plating layer covering the base layer.

The first external electrode 121 is disposed continuous with the first end surface 100*e*1 and the bottom surface 100*b*. According to the above configuration, the first external electrode 121 is a so-called L-shaped electrode, so that solder fillet can be formed on the first external electrode 121 when mounting the inductor component 1 on the mount substrate. As a result, the inductor component 1 can have improved mounting strength and more stabilized mounting attitude.

The first external electrode 121 includes a first end surface portion 121*e* disposed on the first end surface 100*e*1 and a first bottom surface portion 121*b* disposed on the bottom surface 100*b*. The first end surface portion 121*e* and the first bottom surface portion 121*b* are in connection. The first end surface portion 121*e* is embedded in the first end surface 100*e*1 in such a manner as to be exposed from the first end surface 100*e*1. The first bottom surface portion 121*b* is arranged on the bottom surface 100*b* in such a manner as to be raised from the bottom surface 100*b*. The first end surface portion 121*e* is connected to the second through wire 14 of the coil 110.

The first end surface portion 121*e* includes a first portion 121*e*1, a second portion 121*e*2, and a third portion 121*e*3 that are connected in order along Z direction. The first portion 121*e*1 is connected to the first bottom surface portion 121*b* on the bottom surface 100*b*. The second portion 121*e*2 is connected to the second through wire 14 in the base body 10. When viewed from the first end surface 100*e*1 side in X direction, the first portion 121*e*1, the second portion 121*e*2, and the third portion 121*e*3 are rectangular in shape. The first portion 121*e*1, the second portion 121*e*2, and the third portion 121*e*3 differ from one another in dimension in Y detection.

The second external electrode 122 is disposed continuous with the second end surface 100*e*2 and the bottom surface 100*b*. According to the above configuration, the second external electrode 122 is a so-called L-shaped electrode, so that solder fillet can be formed on the second external electrode 122 when mounting the inductor component 1 on the mount substrate. As a result, the inductor component 1 can have improved mounting strength and more stabilized mounting attitude.

The second external electrode 122 includes a second end surface portion 122*e* disposed on the second end surface 100*e*2 and a second bottom surface portion 122*b* disposed on the bottom surface 100*b*. The second end surface portion 122*e* and the second bottom surface portion 122*b* are in connection. The second end surface portion 122*e* is connected to the first through wire 13 of the coil 110. The second end surface portion 122*e* is embedded in the second end surface 100*e*2 in such a manner as to be exposed from the second end surface 100*e*2. The second bottom surface portion 122*b* is arranged on the bottom surface 100*b* in such a manner as to be raised from the bottom surface 100*b*.

The second end surface portion 122*e* includes a first portion 122*e*1, a second portion 122*e*2, and a third portion 122*e*3 that are connected in order along Z direction. The first portion 122*e*1 is connected to the second bottom surface portion 122*b* on the bottom surface 100*b*. The second portion 122*e*2 is connected to the first through wire 13 in the base body 10. When viewed from the second end surface 100*e*2 side in X direction, the first portion 122*e*1, the second portion 122*e*2, and the third portion 122*e*3 are rectangular in shape. The first portion 122*e*1, the second portion 122*e*2, and the third portion 122*e*3 differ from one another in dimension in Y detection.

<Overlapping Area of First External Electrode and Overlapping Area of Second External Electrode>

As shown in FIG. 2, when viewed from a direction orthogonal to the bottom surface 21*b*, the area of the overlapping portion (hatched by solid lines of FIG. 2) between the first external electrode 121 and the bottom surface wire 11*b* is smaller than the area of the overlapping portion (hatched by broken lines of FIG. 2) between the first external electrode 121 and the top surface wire 11*t*. Specifically, the area of the overlapping portion between the first bottom surface portion 121*b* and the bottom surface wire 11*b* is smaller than the area of the overlapping portion between the first bottom surface portion 121*b* and the top surface wire 11*t*. As a result, the parasitic capacitance can be decreased between the first bottom surface portion 121*b* and the bottom surface wire 11*b*.

The overlapping portions between the first external electrode 121 and the bottom and top surface wires 11*b* and 11*t* exclude overlapping portions between the portion (second portion 121*e*2) of the first external electrode 121 connected directly to the coil 110 (second through wire 14) and the bottom and top surface wires 11*b* and 11*t*. This is due to the fact that because the second portion 121*e*2 has substantially the same potential as that of the bottom surface wire 11*b* even though the second portion 121*e*2 overlaps the bottom surface wire 11*b*, the parasitic capacitance is small from the very first between the second portion 121*e*2 and the bottom surface wire 11*b*.

The second external electrode 122 has the same configuration as that of the first external electrode 121. When viewed from a direction orthogonal to the bottom surface 21*b*, the area of the overlapping portion (hatched by solid lines of FIG. 2) between the second external electrode 122 and the bottom surface wire 11*b* is smaller than the area of the overlapping portion (hatched by broken lines of FIG. 2) between the second external electrode 122 and the top surface wire 11*t*. Specifically, the area of the overlapping portion between the second bottom surface portion 122*b* and the bottom surface wire 11*b* is smaller than the area of the overlapping portion between the second bottom surface portion 122*b* and the top surface wire 11*t*. As a result, the parasitic capacitance can be decreased between the second bottom surface portion 122*b* and the bottom surface wire 11*b*.

The overlapping portions between the second external electrode 122 and the bottom and top surface wires 11*b* and 11*t* exclude overlapping portions between the portion (second portion 122*e*2) of the second external electrode 122 connected directly to the coil 110 (first through wire 13) and the bottom and top surface wires 11*b* and 11*t*. This is due to the fact that because the second portion 122*e*2 has substantially the same potential as that of the bottom surface wire 11*b* even though the second portion 122*e*2 overlaps the bottom surface wire 11*b*, the parasitic capacitance is small from the very first between the second portion 122*e*2 and the bottom surface wire 11*b*.

<Method of Fabricating Inductor Component 1>

Referring then to FIGS. 4A to 4H, a method of fabricating the inductor component 1 will be described. FIGS. 4A to 4H are views corresponding to a section B-B of FIG. 2.

Figure 4A:
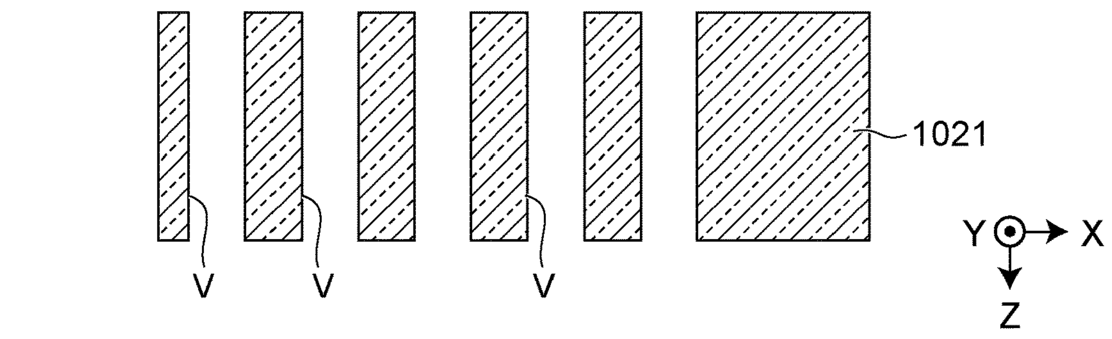
FIG. 4A is a schematic section view illustrating a method of fabricating the inductor component.

As shown in FIG. 4A, a glass substrate 1021 to be the substrate 21 is prepared. The glass substrate 1021 is a single-layer glass plate. A plurality of through holes V are disposed on the glass substrate 1021 at predetermined positions. Although at this time the glass substrate 1021 is opened by laser processing, it may be opened by dry or wet etching or by machining such as drilling.

Figure 4B:
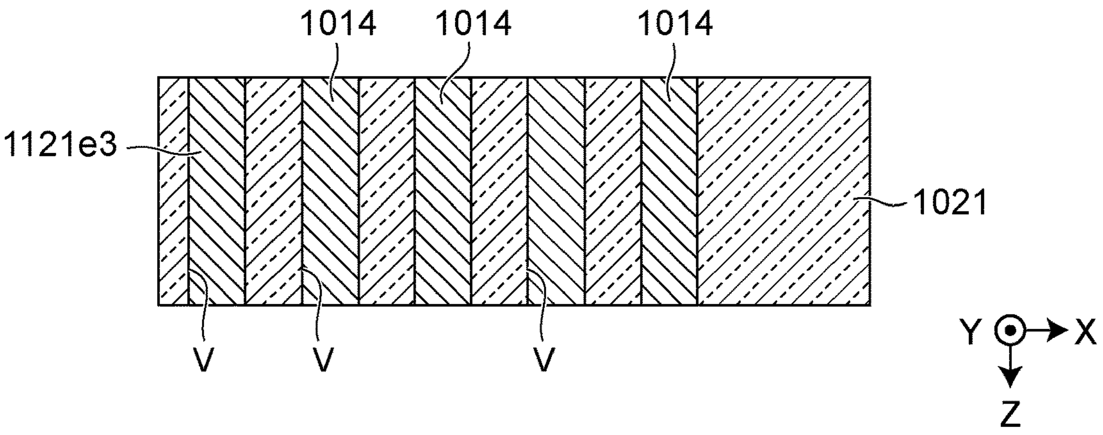
FIG. 4B is a schematic section view illustrating the method of fabricating the inductor component.

As shown in FIG. 4B, a seed layer not shown is disposed over the entire surface of the glass substrate 1021 and a copper layer is formed on the seed layer by electroplating. The seed layer and the copper layer on the top surface and the bottom surface of the glass substrate 1021 are removed by wet etching or dry etching. Through conductor layers 1014 to be the second through wires 14 are thereby formed in the through holes V of the glass substrate 1021. A third base layer 1121*e*3 is formed that constitutes a base of the third portion 121*e*3 of the first end surface portion 121*e*. At this time, although not shown, similarly, through conductor layers to be the first through wires 13 are formed in the through holes V, and a third base layer is formed that constitutes a base of the third portion 122*e*3 of the second end surface portion 122*e*.

CMP processing or machining may be used in removing the copper layer. Within the through holes V, voids may be filled with conductive resin after partial plating.

Figure 4C:
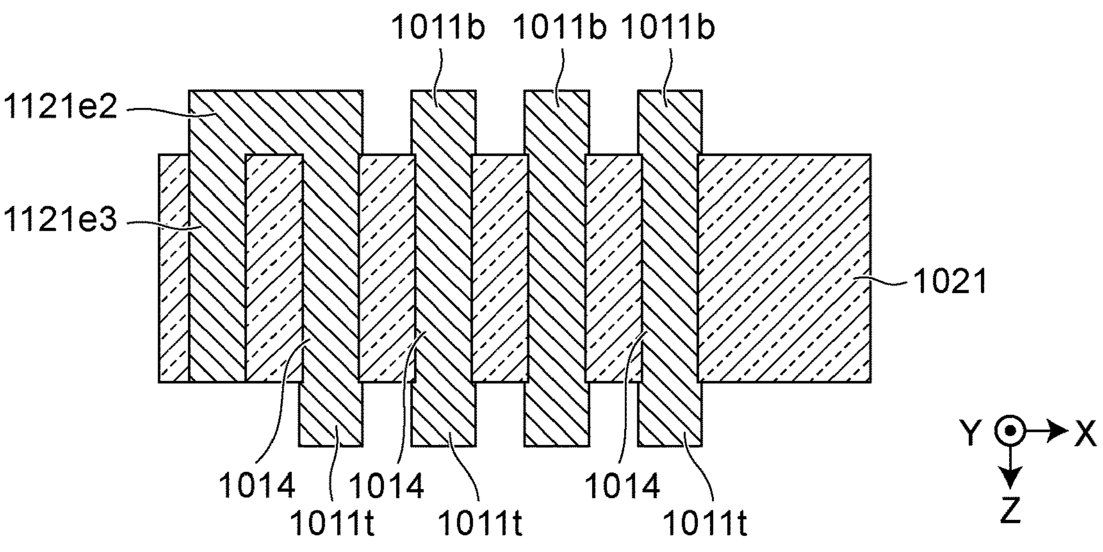
FIG. 4C is a schematic section view illustrating the method of fabricating the inductor component.

As shown in FIG. 4C, a seed layer not shown is disposed over the entire surface of the glass substrate 1021 and a patterned photoresist is formed on the seed layer. A copper layer is then formed on the seed layer in an opening of the photoresist by electroplating. Subsequently, the photoresist and the seed layer are removed by wet etching or dry etching. A bottom surface conductor layer 1011*b* as the bottom surface wire 11*b* and a top surface conductor layer 1011*t* as the top surface wire 11*t*, patterned into any shape, are thereby formed. A second base layer 1121*e*2 is formed that constitutes a base of the second portion 121*e*2 of the first end surface portion 121*e*. At this time, although not shown, similarly, a second base layer is formed that constitutes a base of the second portion **122*e*2 of the second end surface portion 122*e***.

Figure 4D:
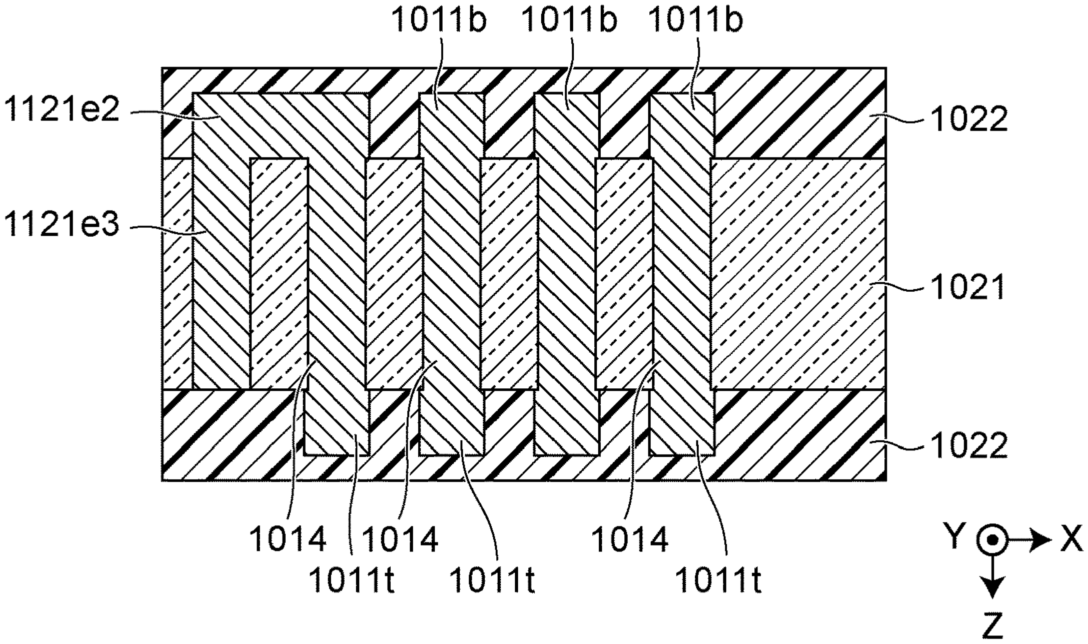
FIG. 4D is a schematic section view illustrating the method of fabricating the inductor component.
Figure 4E:
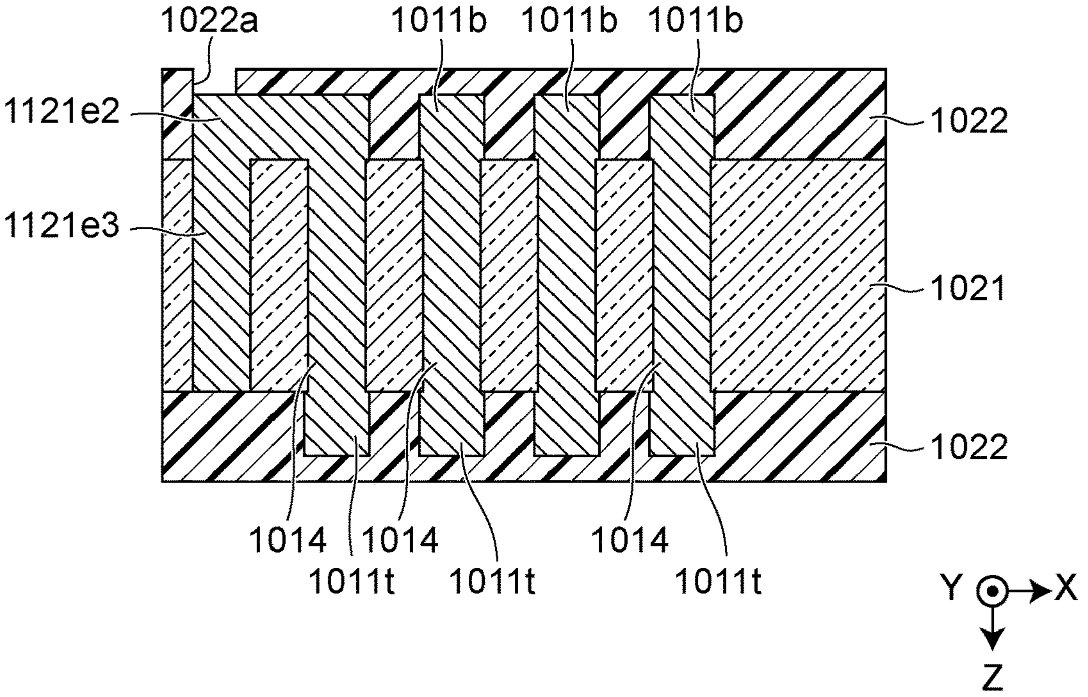
FIG. 4E is a schematic section view illustrating the method of fabricating the inductor component.

As shown in FIG. 4D, an insulating resin layer 1022 to be the insulation layer 22 is applied and cured on the top surface and the bottom surface of the glass substrate 1021 so as to cover the conductor layer. As shown in FIG. 4E, a hole **1022*a* is disposed on the second base layer 1121*e*2 of the insulating resin layer 1022** on the bottom surface side using laser processing.

Figure 4F:
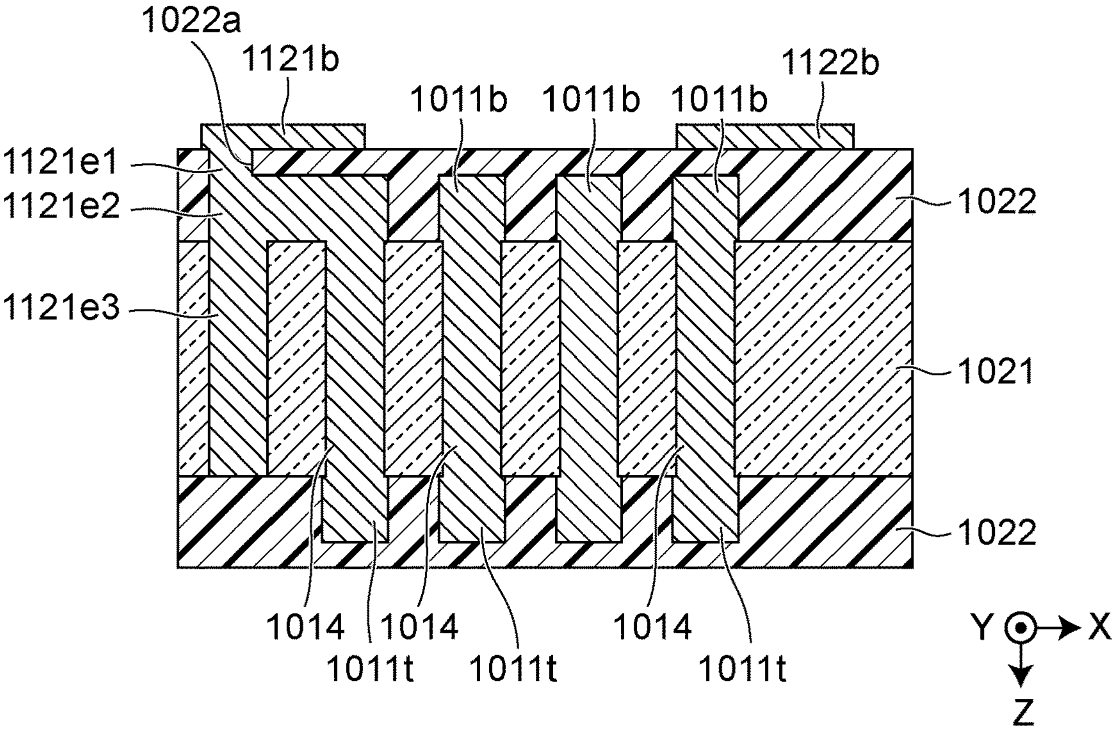
FIG. 4F is a schematic section view illustrating the method of fabricating the inductor component.

As shown in FIG. 4F, a seed layer not shown is disposed on the insulating resin layer 1022 on the bottom surface side and a patterned photoresist is formed on the seed layer. A copper layer is then formed on the seed layer in an opening of the photoresist by electroplating. Subsequently, the photoresist and the seed layer are removed by wet etching or dry etching. A first bottom surface base layer **1121*b* as a base of the first bottom surface portion 121*b* and a second bottom surface base layer 1122*b* as a base of the second bottom surface portion 122*b*, patterned into any shape, are thereby formed. A first base layer 1121*e*1 as a base of the first portion 121*e*1 of the first end surface portion 121*e* is formed in the hole 1022*a*. At this time, although not shown, similarly, a first base layer as a base of the first portion 122*e*1 of the second end surface portion 122*e* is formed in a hole of the insulating resin layer 1022** on the bottom surface side.

Figure 4G:
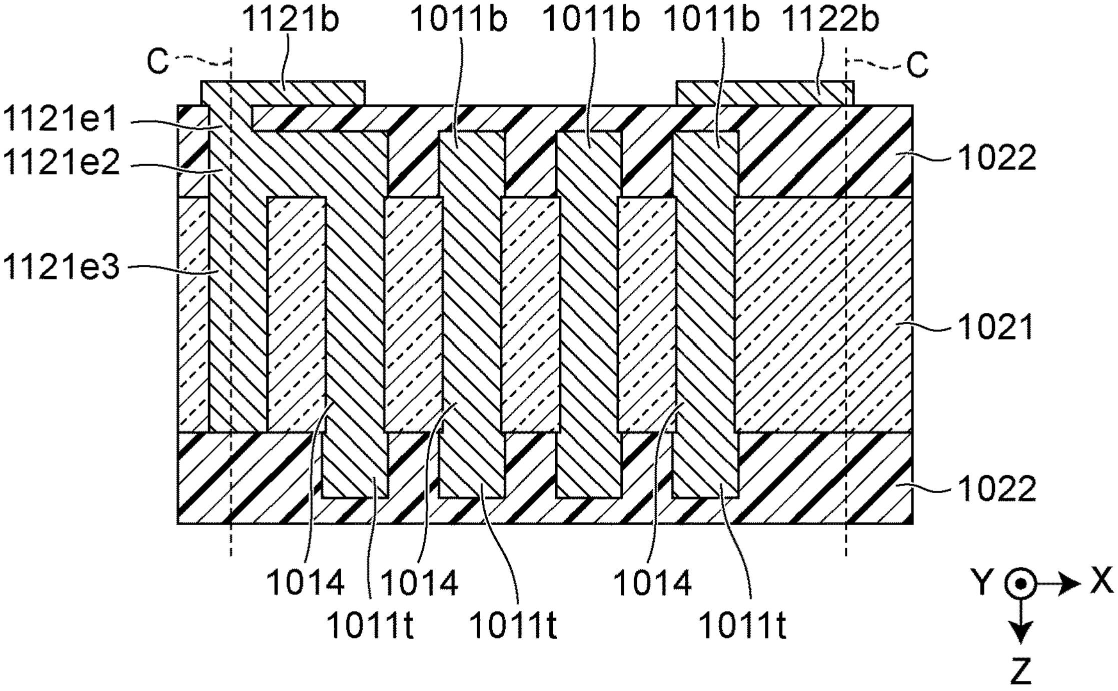
FIG. 4G is a schematic section view illustrating the method of fabricating the inductor component.
Figure 4H:
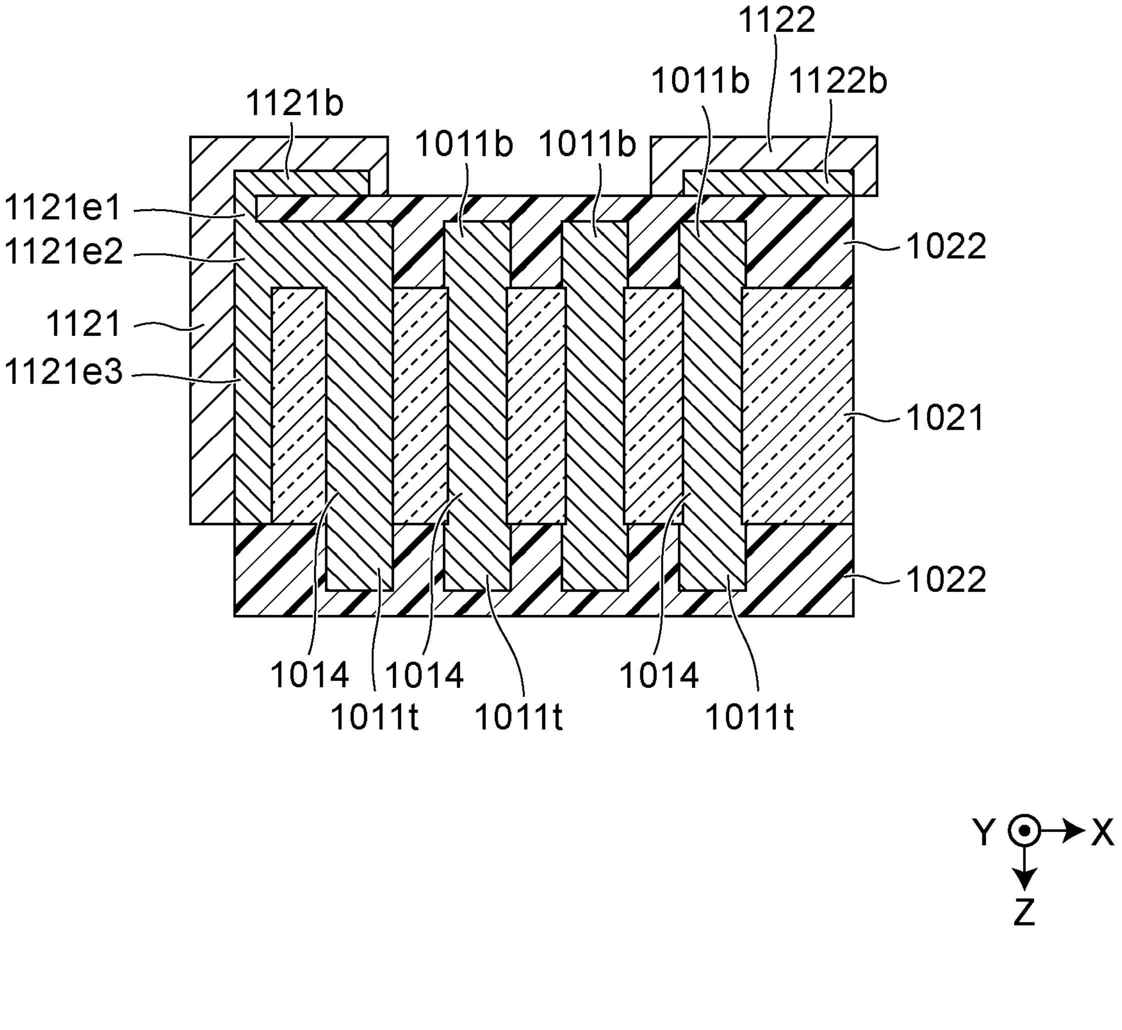
FIG. 4H is a schematic section view illustrating the method of fabricating the inductor component.

The base body 10 is individualized at cut lines C as shown in FIG. 4G, and plating layers 1121 and 1122 are formed by barrel plating as shown in FIG. 4H. That is, the first external electrode 121 is formed by covering the first bottom surface base layer **1121*b*, the first base layer 1121*e*1, the second base layer 1121*e*2, and the third base layer 1121*e*3 with the plating layer 1121. The second external electrode 122 is formed by covering the second bottom surface base layer 1122*b* and the first base layer, second base layer, and third base layer connected to the second bottom surface base layer 1122*b* with the plating layer 1122. The inductor component 1** is thus fabricated.

The plating layers 1121 and 1122 are each composed of e.g. two layers of Ni/Si. The plating layers 1121 and 1122 may each be composed of e.g. a plurality of layers of Cu/Ni/Au or Cu/Ni/Pd/Au. The external electrodes may include only the base layers without the plating layers. Optimum materials may appropriately be selected in view of rust prevention, solder wettability, electromigration resistance, etc.

Although in the above fabrication method the glass substrate is used as the base body, a sintered material may be used for the base body. In this case, one or less turn of inductor wiring is formed from conductive paste by printing. A material with good conductivity such as Ag or Cu is selected as the conductive paste.

Insulating paste of glass, ferrite or the like is then printed, which is repeated. Openings that open to connecting portions of the inductor wiring are formed in the insulating paste, and conductive paste is filled into the openings, to thereby achieve electrical connection of the connecting portions of the inductor wiring among the layers.

Subsequently, the insulating paste is sintered by heat treatment at high temperature, and then the base body 10 is individualized, after which the external terminals are formed to fabricate the inductor component. By using a highly insulating paste such glass paste, there can be obtained an inductor component having high Q even at high frequencies. Use of ferrite for the insulating paste enables obtainment of an inductor component with high inductance.

3. Variants

<First Variant>

Figure 5:
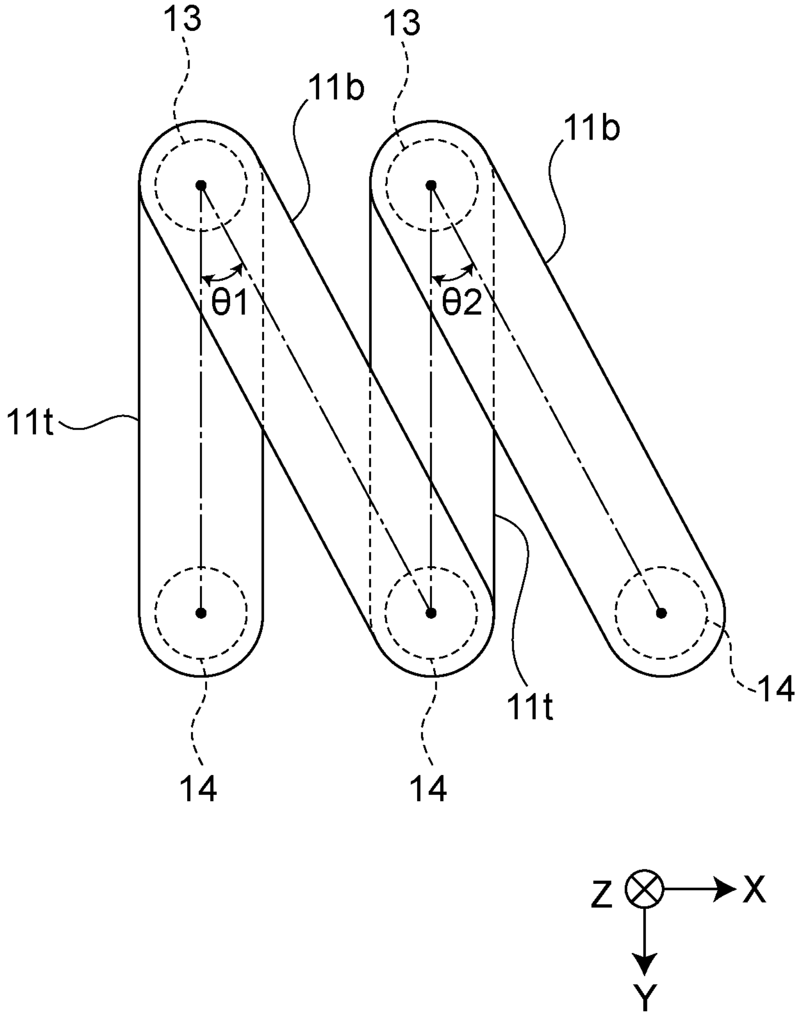
FIG. 5 is a schematic bottom view of a first variant of the inductor component seen from the bottom surface side.

FIG. 5 is a schematic bottom view showing a first variant of the inductor component seen from the bottom surface **100*b* (bottom surface 21*b***) side.

As shown in FIG. 5, in the inductor component of the first variant, the bottom surface wire **11*b* includes a plurality of bottom surface wires 11*b*, and the top surface wire 11*t* includes a plurality of top surface wires 11*t*. When viewed from a direction orthogonal to the bottom surface 21*b*, a first end of one bottom surface wire 11*b* overlaps a first end of one top surface wire 11*t* so that the one bottom surface wire 11*b* and the one top surface wire 11*t* make up one set of a plurality of sets. When viewed from a direction orthogonal to the bottom surface 21*b*, an angle formed between the bottom surface wire 11*b* and the top surface wire 11*t* of at least one set differs from an angle formed between the bottom surface wire 11*b* and the top surface wire 11*t* of another set. Specifically, a first angle θ1 formed between the bottom surface wire 11*b* and the top surface wire 11*t* of a first set differs from a second angle θ2 formed between the bottom surface wire 11*b* and the top surface wire 11*t* of a second set. When changing the above angle, the length of the coil 110** changes and inductance varies.

According to the above configuration, since the first angle θ1 differs from the second angle θ2, the length of the coil 110 can flexibly be changed so that an inductor component having desired inductance can easily be obtained. The angles formed between the bottom surface wire **11*b* and the top surface wire 11*t*** of all the sets may differ from one another.

<Second Variant>

Figure 6:
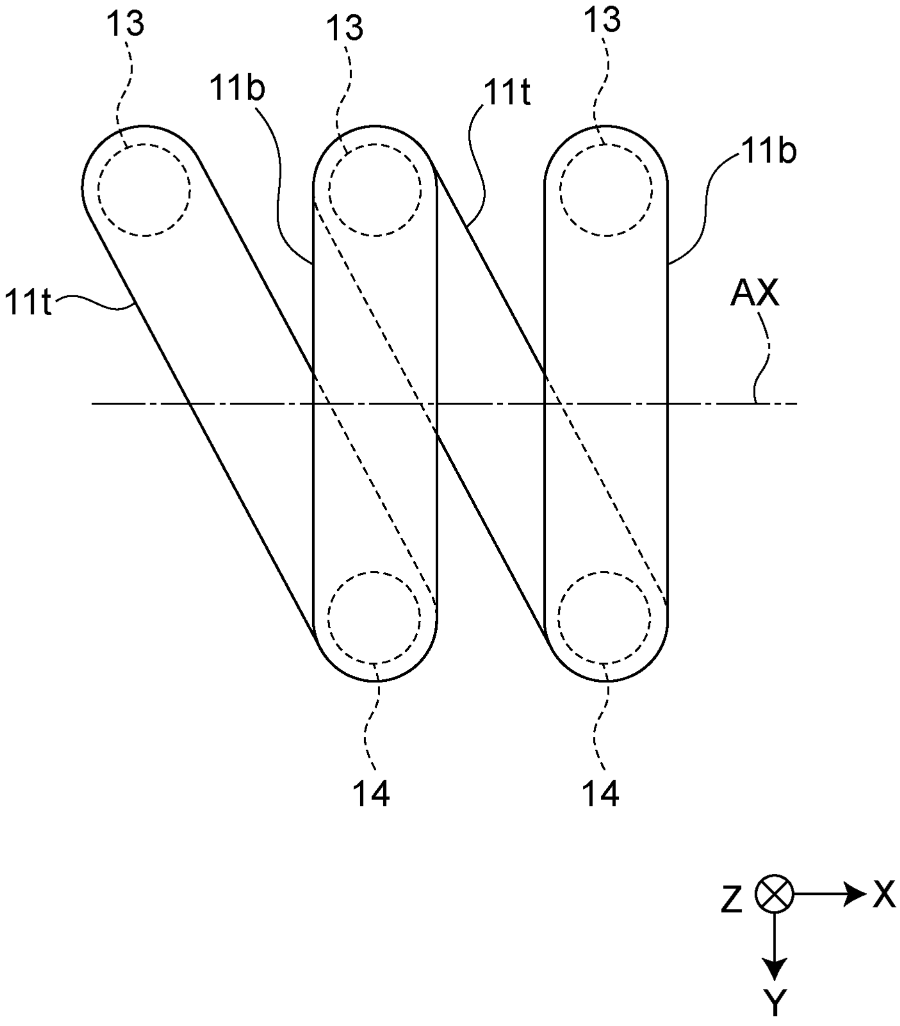
FIG. 6 is a schematic bottom view of a second variant of the inductor component seen from the bottom surface side.

FIG. 6 is a schematic bottom view showing a second variant of the inductor component seen from the bottom surface **100*b* (bottom surface 21*b***) side.

As shown in FIG. 6, in the inductor component of the second variant, the bottom surface wire **11*b* includes a plurality of bottom surface wire 11*b*, the first through wire 13 includes a plurality of first through wires 13, and the second through wire 14 includes a plurality of second through wires 14. One bottom surface wire 11*b*, and one first through wire 13 and one second through wire 14 connected respectively to ends of the one bottom surface wire 11*b* make up one set of a plurality of sets. When viewed from a direction orthogonal to the bottom surface 21*b*, an extension direction of the bottom surface wire 11*b* connected to the first through wire 13 and the second through wire 14 of at least one set is orthogonal to the direction of the axis AX of the coil 110, and the first through wire 13 and the second through wire 14 of the at least one set are arranged line-symmetric with respect to the axis AX of the coil 110. Specifically, the bottom surface wire 11*b* is of a shape extending in Y unlike FIG. 2, while the top surface wire 11*t* extends in Y direction with a slight tile toward X direction unlike FIG. 2**.

According to the above configuration, as compared with the case where the extension direction of the bottom surface wire **11*b* tilts with respect to the direction of the axis AX of the coil 110, the dimension in the direction of the axis AX of the coil 110** can be reduced, enabling the inductor component to be reduced in size.

Preferably, the first through wire 13 and the second through wire 14 of one half or more of all the sets are arranged line-symmetric with respect to the axis AX of the coil 110, and more preferably, the first through wire 13 and the second through wire 14 of all the sets are arranged line-symmetric with respect to the axis AX of the coil 110, thereby achieving a further reduction in the dimension in the direction of the axis AX of the coil 110.

<Third Variant>

Figure 7:
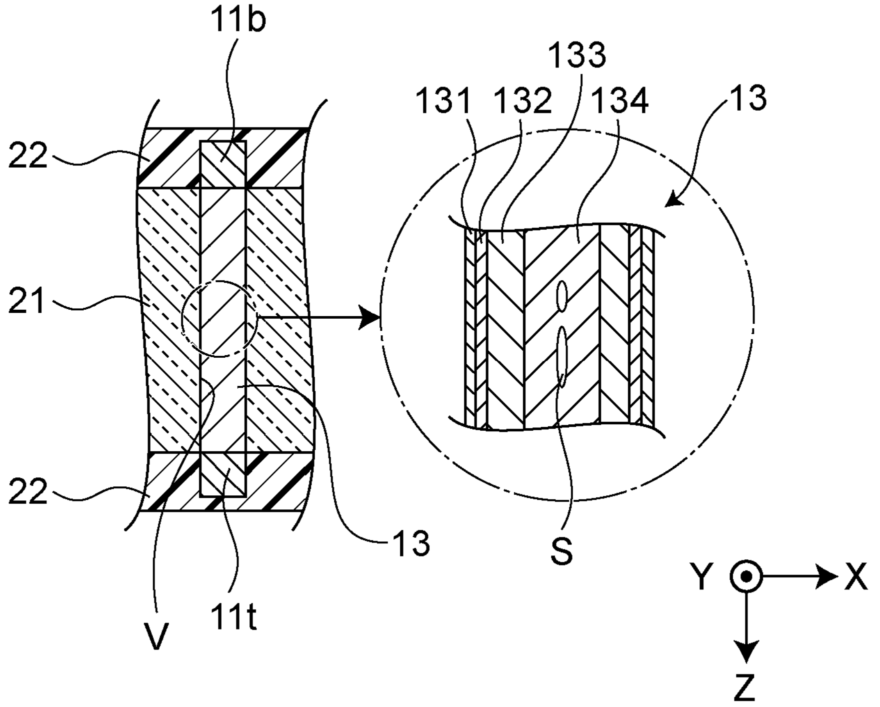
FIG. 7 is a section view of a third variant of the inductor component taken along plane X-Z.

FIG. 7 is a section view showing a third variant of the inductor component taken along plane X-Z.

As shown in FIG. 7, in the inductor component of the third variant, the first through wire 13 includes a plurality of conductor layers 131 to 134, of which at least one conductor layer contains copper as a main component.

Specifically, the first through wire 13 includes the four conductor layers 131 to 134. The first conductor layer 131, the second conductor layer 132, the third conductor layer 133, and the fourth conductor layer 134 are arranged in this order radially inward from radially outside. The first conductor layer 131, the second conductor layer 132, and the third conductor layer 133 are each formed in an annular shape, whereas the fourth conductor layer 134 is formed in a cylindrical shape. The first conductor layer 131 contains titanium as a main component, the second conductor layer 132 and the third conductor layer 133 contain copper as a main component, and the fourth conductor layer 134 contains silver and copper. The first conductor layer 131, the second conductor layer 132, the third conductor layer 133, and the fourth conductor layer 134 are formed in this order within the through holes V by e.g. plating.

According to the above configuration, since at least one conductor layer contains copper as a main component, the first through wire 13 can have suppressed DC resistance due to copper having high conductivity. At least one of the first through wire 13 and the second through wire 14 may include a plurality of conductor layers, with at least one conductor layer containing Cu as a main component.

As another variant, at least one conductor layer may be made of conductive resin. Specifically, the fourth conductor layer 134 may be made of conductive resin. The fourth conductor layer 134 is formed within each of the through holes V by e.g. applying conductor paste. This allows the through holes V to be easily filled with conductive resin.

At least one conductor layer may have voids S. Preferably, the radially innermost conductor layer has the voids S. Specifically, the fourth conductor layer 134 has the voids S. This allows the voids S to relieve stress.

<Fourth Variant>

Figure 8:
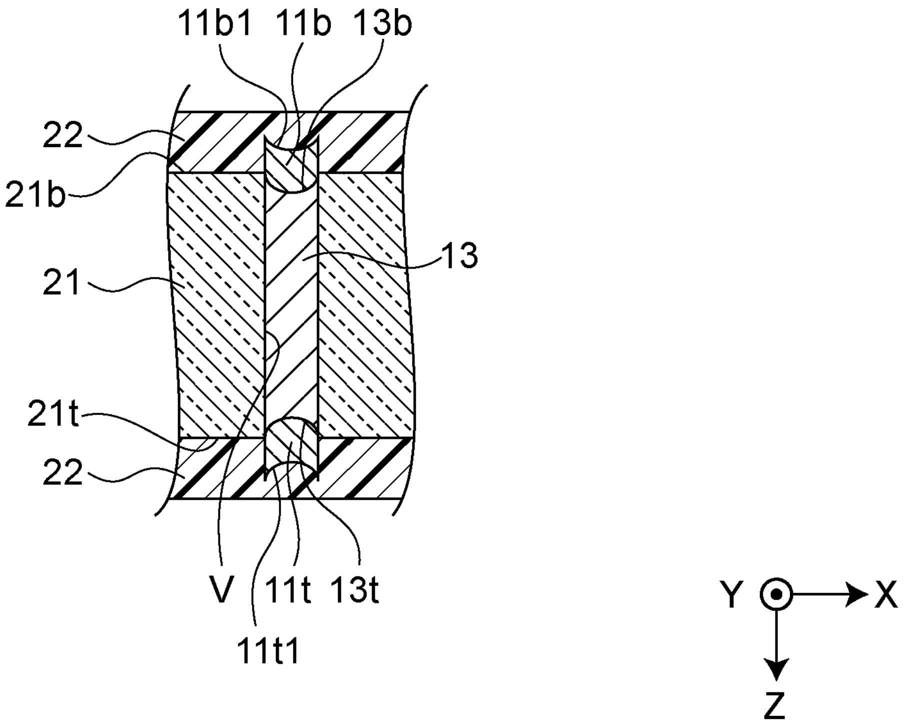
FIG. 8 is a section view of a fourth variant of the inductor component taken along plane X-Z.

FIG. 8 is a section view showing a fourth variant of the inductor component taken along plane X-Z.

As shown in FIG. 8, in the inductor component of the fourth variant, when viewed from a direction orthogonal to the bottom surface 21*b*, the bottom surface wire 11*b* has a recess formed on an upper surface 11*b*1 of a portion that overlaps an end surface 13*b*, toward the bottom surface wire 11*b*, of the first through wire 13 connected to the bottom surface wire 11*b*. According to this, since the upper surface 11*b*1 of the bottom surface wire 11*b* is concaved, the area of the upper surface 11*b*1 of the bottom surface wire 11*b* increases, leading to improvement in intimate adhesiveness with the insulating layer 22. Similarly, the bottom surface wire 11*b* may have a recess formed on an upper surface of a portion that overlaps an end surface of the second through wire 14.

In the same manner, when viewed from a direction orthogonal to the top surface 21*t*, the top surface wire 11*t* has a recess formed on an upper surface 11*t*1 of a portion that overlaps an end surface 13*t*, toward the top surface wire 11*t*, of the first through wire 13 connected to the top surface wire 11*t*. According to this, since the upper surface 11*t*1 of the top surface wire 11*t* is concaved, the area of the upper surface 11*t*1 of the top surface wire 11*t* increases, leading to improvement in intimate adhesiveness with the insulating layer 22. Similarly, the top surface wire 11*t* may have a recess formed on an upper surface of a portion that overlaps an end surface of the second through wire 14.

In a method of forming the recess on the upper surface 11*b*1 of the bottom surface wire 11*b* and on the upper surface 11*t*1 of the top surface wire 11*t*, for example, without removing the copper layer in FIG. 4B, the bottom surface conductor layer 1011*b* and the top surface conductor layer 1011*t* are formed as shown in FIG. 4C, whereby a concaved shape can be imparted to the upper surfaces of the bottom surface conductor layer 1011*b* and the top surface conductor layer 1011*t* that correspond to the through holes V.

Second Embodiment

Figure 9:
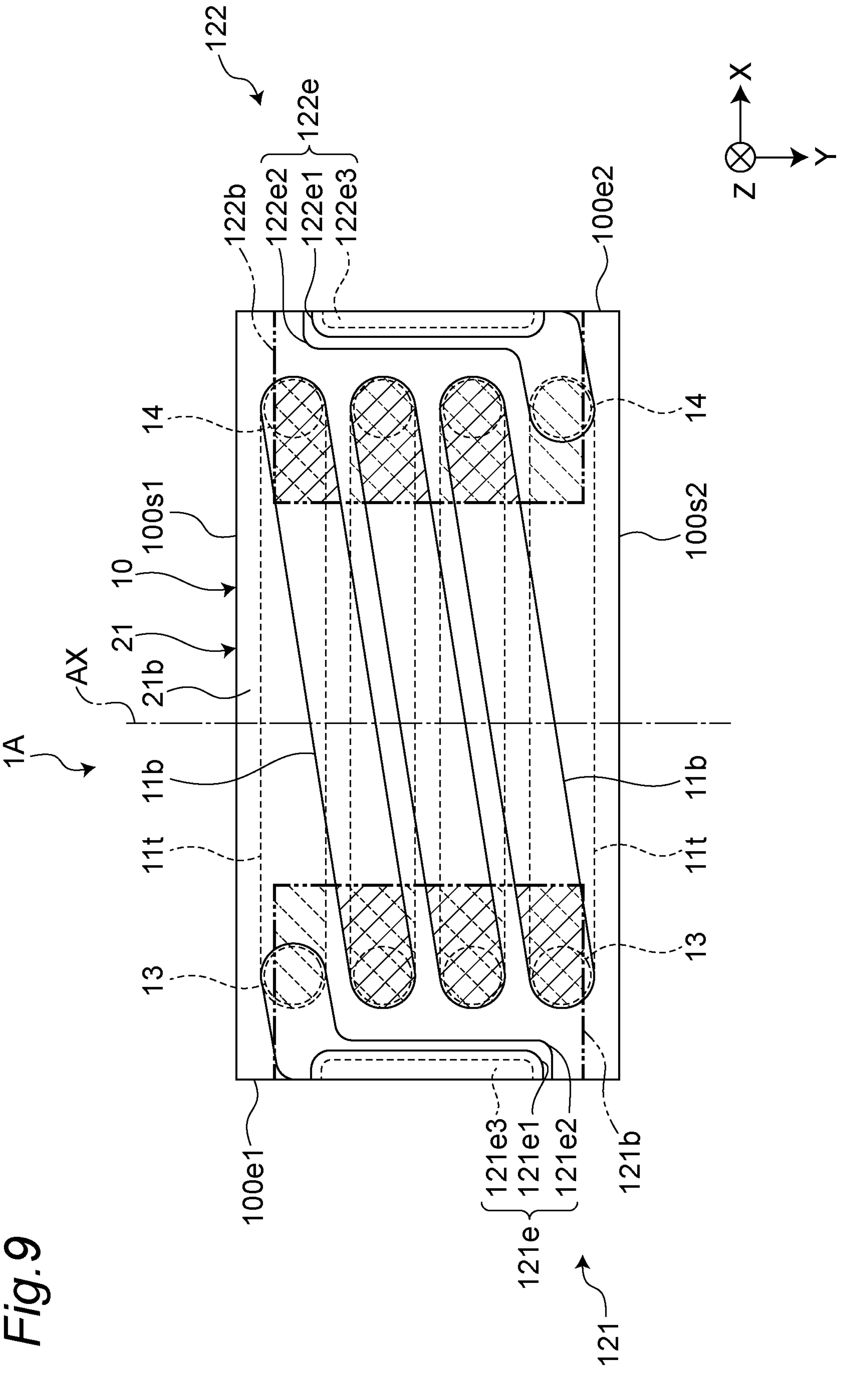
FIG. 9 is a schematic bottom view of a second embodiment of an inductor component seen from the bottom surface side.

FIG. 9 is a schematic bottom view of a second embodiment of an inductor component seen from the bottom surface side. In FIG. 9, for convenience, the insulating layer of the base body is not shown with a part (bottom surface portion) of each of the external electrodes indicated by a two-dot chain line. The second embodiment differs from the first embodiment in position of the axis of the coil. This different configuration will be described below. The other configurations are the same as those in the first embodiment and are designated by the same reference numerals, of which explanations will be omitted.

As shown in FIG. 9, in an inductor component 1A of the second embodiment, the axis AX of the coil 110 is perpendicular to X direction. Specifically, the axis AX is parallel to Y detection. This can reduce interference of the first external electrode 121 and the second external electrode 122 with magnetic flux of the coil 110, achieving improvement in induction acquisition efficiency.

In the inductor component 1A of the second embodiment, similarly to the first embodiment, when viewed from a direction orthogonal to the bottom surface 21*b*, the area of an overlapping portion (hatched by solid lines of FIG. 9) between the first external electrode 121 and the bottom surface wire 11*b* is smaller than the area of an overlapping portion (hatched by broken lines of FIG. 9) between the first external electrode 121 and the top surface wire 11*t*. This can reduce the parasitic capacitance between the first external electrode 121 (first bottom surface portion 121*b*) and the bottom surface wire 11*b*.

When viewed from a direction orthogonal to the bottom surface 21*b*, the area of an overlapping portion (hatched by solid lines of FIG. 9) between the second external electrode 122 and the bottom surface wire 11*b* is smaller than the area of an overlapping portion (hatched by broken lines of FIG. 9) between the second external electrode 122 and the top surface wire 11*t*. This can reduce the parasitic capacitance between the second external electrode 122 (second bottom surface portion 122*b*) and the bottom surface wire 11*b*.

Although not shown, the axis AX of the coil 110 may be perpendicular to the bottom surface 100*b* of the base body 10, thereby enabling reduction in interference of the first external electrode 121 and the second external electrode 122 with magnetic flux of the coil 100 to attain improved induction acquisition efficiency.

The present disclosure is not limited to the above embodiments and can be altered in design without departing from the gist of the present disclosure. For example, the features of the first and second embodiments may variously be combined.

What is claimed is:

1. An inductor component comprising:

a base body;

a coil disposed on the base body and wound helically along an axis; and a first external electrode and a second external electrode disposed on the base body and connected electrically to the coil, the base body including: a substrate having a first main surface and a second main surface that face each other; and an insulating layer disposed on the first main surface, the coil including: a first coil wire disposed on the first main surface and covered with the insulating layer; a second coil wire disposed on the second main surface; and a first through wire and a second through wire both extending through the substrate from the first main surface to the second main surface and arranged opposite to each other with respect to the axis, the first coil wire, the first through wire, the second coil wire, and the second through wire being connected in mentioned order, to make up at least a part of the helical, the first coil wire and the second coil wire are closest to a first end surface of the substrate that extends between the first main surface and the second main surface, at least a part of the first external electrode being disposed above the first coil wire and on the insulating layer spaced apart from the first coil wire, and when viewed from a direction orthogonal to the first main surface, the first external electrode overlaps each of the first coil wire and the second coil wire, with an overlapping portion between the first external electrode and the first coil wire being smaller in area than an overlapping portion between the first external electrode and the second coil wire.

2. The inductor component of claim 1, wherein the substrate includes glass.

3. The inductor component of claim 2, wherein the substrate contains Si element.

4. The inductor component of claim 2, wherein the first through wire and the second through wire extend in a direction orthogonal to the first main surface.

5. The inductor component of claim 2, wherein the insulating layer has a thickness that is one third or less of the thickness of the substrate, and the insulating layer has a permittivity that is smaller than the permittivity of the substrate.

6. The inductor component of claim 1, wherein the first through wire and the second through wire extend in a direction orthogonal to the first main surface.

7. The inductor component of claim 1, wherein the insulating layer has a thickness that is one third or less of the thickness of the substrate, and the insulating layer has a permittivity that is smaller than the permittivity of the substrate.

8. The inductor component of claim 1, wherein the first coil wire extends in only one direction.

9. The inductor component of claim 1, wherein the second coil wire extends in only one direction.

10. The inductor component of claim 1, wherein when viewed from a direction orthogonal to the first main surface, a first end of the first coil wire overlaps a first end of the second coil wire, and an angle defined between the first coil wire and the second coil wire is an acute angle.

11. The inductor component of claim 10, wherein the angle is from 5 degrees to 45 degrees.

12. The inductor component of claim 1, wherein the first coil wire includes a plurality of first coil wires, with the second coil wire including a plurality of second coil wires, when viewed from a direction orthogonal to the first main surface, a first end of one first coil wire overlaps a first end of one second coil so that the one first coil wire and the one second coil wire make up one set of a plurality of sets, and when viewed from a direction orthogonal to the first main surface, an angle defined between the first coil wire and the second coil wire of at least one set differs from an angle defined between the first coil wire and second coil wire of another set.

13. The inductor component of claim 1, wherein the first coil wire includes a plurality of first coil wires, the first through wire includes a plurality of first through wires, with the second through wire including a plurality of second through wires, one first coil wire and one first through wire and one second through wire connected respectively to ends of the one first coil wire make up one set of a plurality of sets, and when viewed from a direction orthogonal to the first main surface, an extension direction of the first coil wire connected to the first through wire and the second through wire of at least one set is orthogonal to the direction of the axis of the coil, with the first through wire and the second through wire of the at least one set being arranged line-symmetric with respect to the axis of the coil.

14. The inductor component of claim 1, wherein the second coil wire includes a plurality of second coil wires, the first through wire includes a plurality of first through wires, with the second through wire including a plurality of second through wires, one second coil wire and one first through wire and one second through wire connected respectively to ends of the one second coil wire make up one set of a plurality of sets, and when viewed from a direction orthogonal to the first main surface, an extension direction of the second coil wire connected to the first through wire and the second through wire of at least one set is orthogonal to the direction of the axis of the coil, with the first through wire and the second through wire of the at least one set being arranged line-symmetric with respect to the axis of the coil.

15. The inductor component of claim 1, wherein at least one of the first through wire and the second through wire has a circular section orthogonal to an extension direction thereof.

16. The inductor component of claim 1, wherein at least one of the first through wire and the second through wire includes a plurality of conductor layers, and at least one of the plurality of conductor layers contains copper as a main component.

17. The inductor component of claim 1, wherein at least one of the first through wire and the second through wire includes a plurality of conductor layers, and at least one of the plurality of conductor layers is made of conductive resin.

18. The inductor component of claim 1, wherein when viewed from a direction orthogonal to the first main surface, the first coil wire has a recess on an upper surface of a portion that overlaps an end surface, toward the first coil wire, of the through wire connected to the first coil wire.

19. The inductor component of claim 1, wherein the base body is of a rectangular parallelepiped shape having a length, a width, and a height, the inductor component has a volume of 0.08 $mm^3$ or less, and the inductor component has a long side whose length is 0.65 mm or less.

20. The inductor component of claim 1, wherein the first coil wire, the second coil wire, the first through wire, and the second through wire contain copper as a main component.

21. An inductor component comprising:

a base body;

a coil disposed on the base body and wound helically along an axis; and a first external electrode and a second external electrode disposed on the base body and connected electrically to the coil, the base body including: a substrate having a first main surface and a second main surface that face each other; and an insulating layer disposed on the first main surface, the coil including: a first coil wire disposed on the first main surface and covered with the insulating layer; a second coil wire disposed on the second main surface; and a first through wire and a second through wire both extending through the substrate from the first main surface to the second main surface and arranged opposite to each other with respect to the axis, the first coil wire, the first through wire, the second coil wire, and the second through wire being connected in mentioned order, to make up at least a part of the helical, at least a part of the first external electrode being disposed above the first coil wire and on the insulating layer spaced apart from the first coil wire, when viewed from a direction orthogonal to the first main surface, the first external electrode overlaps each of the first coil wire and the second coil wire, with an overlapping portion between the first external electrode and the first coil wire being smaller in area than an overlapping portion between the first external electrode and the second coil wire, the insulating layer has a thickness that is one third or less of the thickness of the substrate, and the insulating layer has a permittivity that is smaller than the permittivity of the substrate.

22. An inductor component comprising:

a base body;

a coil disposed on the base body and wound helically along an axis; and a first external electrode and a second external electrode disposed on the base body and connected electrically to the coil, the base body including: a substrate having a first main surface and a second main surface that face each other; and an insulating layer disposed on the first main surface, the coil including: a first coil wire disposed on the first main surface and covered with the insulating layer; a second coil wire disposed on the second main surface; and a first through wire and a second through wire both extending through the substrate from the first main surface to the second main surface and arranged opposite to each other with respect to the axis, the first coil wire, the first through wire, the second coil wire, and the second through wire being connected in mentioned order, to make up at least a part of the helical, at least a part of the first external electrode being disposed above the first coil wire and on the insulating layer spaced apart from the first coil wire, when viewed from a direction orthogonal to the first main surface, the first external electrode overlaps each of the first coil wire and the second coil wire, with an overlapping portion between the first external electrode and the first coil wire being smaller in area than an overlapping portion between the first external electrode and the second coil wire, and when viewed from a direction orthogonal to the first main surface, the first coil wire has a recess on an upper surface of a portion that overlaps an end surface, toward the first coil wire, of the through wire connected to the first coil wire.

23. An inductor component comprising:

a base body;

a coil disposed on the base body and wound helically along an axis; and a first external electrode and a second external electrode disposed on the base body and connected electrically to the coil, the base body including: a substrate having a first main surface and a second main surface that face each other; and an insulating layer disposed on the first main surface, the coil including: a first coil wire disposed on the first main surface and covered with the insulating layer; a second coil wire disposed on the second main surface; and a first through wire and a second through wire both extending through the substrate from the first main surface to the second main surface and arranged opposite to each other with respect to the axis, the first coil wire, the first through wire, the second coil wire, and the second through wire being connected in mentioned order, to make up at least a part of the helical, at least a part of the first external electrode being disposed above the first coil wire and on the insulating layer spaced apart from the first coil wire, when viewed from a direction orthogonal to the first main surface, the first external electrode overlaps each of the first coil wire and the second coil wire, with an overlapping portion between the first external electrode and the first coil wire being smaller in area than an overlapping portion between the first external electrode and the second coil wire, at least one of the first through wire and the second through wire includes a plurality of conductor layers, and at least one of the plurality of conductor layers is made of conductive resin.

* * * * *